Dec. 2, 1958 — H. LOWENTHAL — 2,862,418
INVERTED TELEPHOTO OBJECTIVE
Filed May 27, 1957
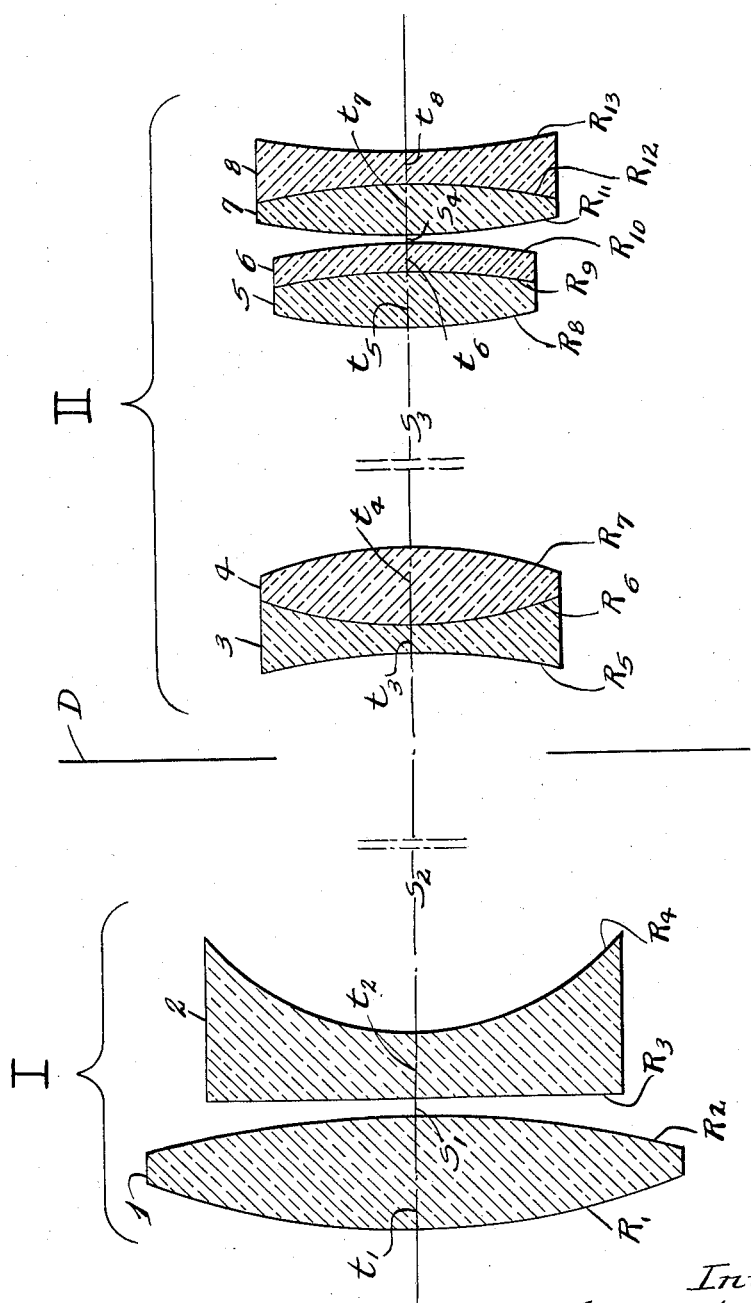
Inventor.
Herman Lowenthal.
By. Zabel, Baker, York, Jones & Dithmar
Attorneys.

United States Patent Office
2,862,418
Patented Dec. 2, 1958

2,862,418

INVERTED TELEPHOTO OBJECTIVE

Herman Lowenthal, Chicago, Ill., assignor to General Scientific Corporation, Chicago, Ill., a corporation of Illinois Application May 27, 1957, Serial No. 661,677

4 Claims. (Cl. 88—57)

This invention relates to an inverted telephoto objective having certain of its components separted by distances which are great in comparison to the thickness of a lens, and more particularly to an objective wherein the components are separated by distances which are of the same order as the focal length of the entire objective. The objective forming the subject matter of the present invention is of the so called reversed or inverted telephoto type.

As is well known, a telephoto objective has a positive member which is widely separated from a negative member, the arrangement providing for the rear principal point being located well ahead of the front member. Such an objective has a total overall length from the front vertex to the focal plane somewhat less than the focal length of the objective. Such an objective is compact but difficult to correct completely and as a rule has a relatively small angle of coverage.

The reversed or inverted telephoto objective has a negative member of substantially larger diameter in front of the positive member. Such a reversed telephoto objective has various applications where a long back focal distance is essential. Thus such reversed telephoto objectives may be used in certain types of reflex cameras where color analysis and separation are important and in moving picture cameras. In the latter, a reversed telephoto objective may be a practical necessity because of the space taken up by such things as a lens turret, a diaphragm or shutter or both and, in the case of stereo cameras, of beam splitting prisms. Thus it is frequently necessary to have a back focal distance which is the same or even greater than the focal length of the entire objective.

In an objective embodying the present invention, a substantial improvement over prior reversed telephoto objectives makes it possible for the new objective to have two relatively large separate air spaces between lens groups, each air space being of about the same order as the focal length of the entire objective. It is thus possible for the new objective to accommodate such elements as reflecting mirrors between the components without impairing the optical characteristics of the system.

In conventional objectives, the air spaces along the axis of the objective between lenses or lens groups are generally small in comparison to the focal length of the entire objective. As a rule such air spaces are used as part of the optical system in the sense that the dimensions of the air spaces form part of the corrective means of the objective. In the objective embodying the present invention, however, the long air spaces, having a length of the same order as the focal length of the objective, cannot be considered as part of the correction means of the objective. Since the long air spaces cannot be considered as simple optical elements having a corrective function for certain aberrations, it is necessary to change the design of the lens components substantially from conventional practice.

The new objective provides an optical system wherein the distance between the front vertex and the focal plane of the objective is of the order of about four times the focal length of the objective. The required dimensions for the two prescribed air spaces determines the above relationship and also requires a back focal distance about equal to the focal length of the new objective. The new objective embodying the present invention is fully corrected for sine condition, coma, astigmatism, chromatic aberrations, curvature of field, spherical aberration and distortion in general.

Making the above corrections in a reversed telephoto objective is particularly difficult where the long air spaces are present. It is well known that the greater the separation of lenses, the weaker the power and the shallower the curves are. This of course improves the optical quality but the field coverage is so small as to require a substantially larger diameter of the front negative member.

Other objects, advantages and details of the invention will be apparent as the description proceeds, reference being had to the accompanying drawing wherein two forms of the invention are shown. It will be understood that the drawing and description are illustrative only and that the scope of the invention is to be measured by the appended claims.

In order that the invention may be understood, two examples will be given. The single figure in the drawing illustrates the examples and following the examples some of the more salient features of the present invention will be disclosed.

In accordance with usual practice, the single figure in the drawing shows the various lenses arranged in a straight line along an optical axis, the object side being to the left of the figure and the focal plane being to the right. In accordance with customary procedure, the left hand end of the figure will be considered as the front end of the objective while the right hand end of the figure will be considered as the rear of the objective.

An objective embodying the present invention comprises two members, front negative member I and rear positive member II. Front negative member I consists of front lens component 1 and rear lens component 2. Front negative member I has a diameter somewhat greater than the diameter of the components making up rear positive member II.

A usual diaphragm D is located in the space between members I and II, as shown in the figure.

Lens components 1 and 2 have dimensions as set forth in the tables and as explained later, these dimensions may vary within limits. In accordance with usual practice, R stands for radius of curvature and the numeral following refers to the particular lens surface indicated. The thickness of a lens component is indicated by $t$ with the numeral corresponding to the particular lens component. The spacing along the optical axis between opposed lens surfaces is indicated by $s$ with appropriate numerals. A positive value for a radius of curvature indicates that the center of curvature is away from the object end of the objective while a negative curvature indicates that the center is on the other side of the particular lens component being considered. The letters $N_D$ refer to the index of refraction for the light having a wave length equal to the sodium D light. The Abbe V number refers to the dispersion characteristics of the glass used in the lens component.

The rear positive member II is spaced from the front negative member I by a distance $s2$ which is about 0.9 times the focal length of the entire objective. In one example, this spacing is somewhat greater than 0.9 and in another example it is somewhat less than 0.9 times the focal length.

The rear positive member II consists of six lens components numbered 3 to 8 inclusive. These six lens components are divided into three compound lenses. The forward compound lens, consisting of lenses 3 and 4, is separated from the next following compound lens 5 by a distance $s3$. This distance in both examples is substantially 1.04 times the focal length of the objective. Lenses 5 to 8 inclusive are divided into two doublets, the first doublet consisting of lenses 5 and 6, being positive in power, and the second doublet, consisting of lenses 7 and 8, being positive in power.

It will be noted in the respective examples given that R5 and R7 to R13, inclusive, are the same in each example. In fact it will be noted that in both examples, beginning with R7 and going toward the rear of the objective, the lens curvature, the thickness of each lens and the air spaces as well as the glass constants are the same. Thus insofar as dimensions are concerned, the variables in the objective embodying the present invention are confined substantially to lens components 1, 2 and 3. R5 also remains the same in two examples.

The front member I consisting of lenses 1 and 2 has an overall negative power. Thus lens 1 is biconvex while lens 2 is planoconcave. The air space separating lenses 1 and 2 is small in terms of the focal length.

The remainder of the objective may be considered as a rear positive member consisting of lenses 3 to 8 inclusive.

Rear positive member II consists of two menisci shaped compound lenses 3 and 4 on the one hand and 7 and 8 on the other hand between which there is disposed biconvex compound lenses 5 and 6. It will be seen that the air space between lenses 4 and 5 in rear positive member II is large and is of the same general order as the focal length of the objective. The distance between front negative member I and rear positive member II, i. e. between lenses 2 and 3, also is of the same general order as the focal length of the objective.

Rear positive member II has the end concave optical surfaces R5 and R13 concave and respectively facing the object and focal plane. The overall length of rear positive member II in both examples is the same and is 1.705 times the focal length of the objective.

In front negative member I, components 1 and 2 may have their thicknesses and air separation varied somewhat within limits while keeping the focal length of the negative component substantially constant. To utilize the principles of the present invention, it is essential that the distance from the front vertex of the objective to the focal plane of the entire objective lie within the range of 3.96 and 3.77 times the focal length of the entire objective. In order to maintain this relationship, the curvature of R1 should be between 1.3 and about 1.0 times the focal length of the entire objective. In the case of R4, the curvature is between 0.4 and 0.5 times the focal length of the objective. The above relationships of curvature may be maintained for the given values $N_D$ of lenses 1 and 2 and with the Abbe V numbers for the two lenses having a difference of less than 20.

Lens 4 should have the radii R6 and R7 between 0.8 and 0.9 times the focal length of the objective. This is also true of radius R6 for lens 3. A greater index of refraction for lenses 3 and 4 may be used to correct aberrations more completely, particularly spherical aberration and coma.

It is understood that lens 3 and 4 have the same index of refraction. The total thickness of lenses 3 and 4 is 0.262 times the focal length and is a substantial factor in obtaining corrections.

The curvature of the front surfaces of the two rear compound lenses R8 and R11 are selected so that the centers of curvature of these two surfaces are substantially where the object and the image are assumed to be in the paraxial region. The value of R8 has negligible effect on spherical aberration and sine condition and in both examples is something less than four times the focal length of the objective. The value of R11 in both examples is 1.544 times the focal length of the objective. It should be noted that the thickness of both compound lenses 5 and 6 on the one hand and 7 and 8 on the other hand are the same and are .198 times the focal length of the objective.

The objectives given in the examples differ in overall length. Example 1 is a long system while Example 2 is a shorter system. In both examples, the coverage of the objective is 20° with full correction and substantially constant light intensity to the edge of the field. This is a significant achievement in view of the long air spaces.

The two examples have identical back focal distances. The same is true of the focal length of the entire rear positive member II. The color correction in the short system of Example 2 is substantially as good as in Example 1.

*Example 1 (longer system)*

[EFL=1.000   BFD=1.027   f:3.5.]

| | | | |
|---|---|---|---|
| 1 | R1=+1.2071<br>t1=0.1717<br>R2=−6.2025<br>s1=0.0145 | $N_D$=1.720 | V=29.2 |
| 2 | R3=Plano<br>t2=0.1048<br>R4=+0.4104<br>s2=0.9371 | $N_D$=1.5838 | V=46.0 |
| 3 | R5=−2.1771<br>t3=0.0566<br>R6=+0.9303 | $N_D$=1.700 | V=30.1 |
| 4 | t4=0.2053<br>R7=−0.8306<br>s3=1.0399 | $N_D$=1.700 | V=47.8 |
| 5 | R8=+3.9984<br>t5=0.1234<br>R9=−1.1306 | $N_D$=1.617 | V=55.0 |
| 6 | t6=0.0747<br>R10=−2.2932<br>s4=0.0073 | $N_D$=1.720 | V=29.2 |
| 7 | R11=+1.5435<br>t7=0.1234<br>R12=−4.7700 | $N_D$=1.617 | V=55.0 |
| 8 | t8=0.0747<br>R13=+3.5972 | $N_D$=1.720 | V=29.2 |

*Example 2 (shorter system)*

[EFL=1.000   BFD=1.027   f:3.5.]

| | | | |
|---|---|---|---|
| 1 | R1=+1.0933<br>t1=0.0809<br>R2=−14.8041<br>s1=0.0479 | $N_D$=1.720 | V=29.2 |
| 2 | R3=Plano<br>t2=0.0363<br>R4=+0.4269<br>s2=0.8726 | $N_D$=1.5838 | V=46.0 |
| 3 | R5=−2.1771<br>t3=0.1814<br>R6=+1.0733 | $N_D$=1.700 | V=30.1 |
| 4 | t4=0.0805<br>R7=−0.8306<br>s3=1.0399 | $N_D$=1.700 | V=47.8 |
| 5 | R8=+3.9984<br>t5=0.1234<br>R9=−1.1306 | $N_D$=1.617 | V=55.0 |
| 6 | t6=0.0747<br>R10=−2.2932<br>s4=0.0073 | $N_D$=1.720 | V=29.2 |
| 7 | R11=+1.5435<br>t7=0.1234<br>R12=−4.7700 | $N_D$=1.617 | V=55.0 |
| 8 | t8=0.0747<br>R13=+3.5972 | $N_D$=1.720 | V=29.2 |

From the above description it is thought that the construction and advantages of this invention will be readily apparent to those skilled in the art. Various changes in detail may be made without departing from the spirit or losing the advantages of the invention.

Having thus described the invention, what I claim as new and desire to secure by Letters Patent is:

1. A photographic objective of the reversed telephoto type, said objective consisting of a front negative member and a rear positive member, said two members having opposed lens components separated by a distance about equal to the focal length of the entire objective, said positive member consisting of forward and rear assemblies separated by a distance which is about equal to the focal length of the entire objective and having an overall length of substantially 1.705 times the focal length of the objective, said objective having a back focal distance which is also about equal to the focal length of the objective and having a distance between the front vertex and the focal plane of between about 3.77 and 3.96 times the focal length of the objective, said negative member consisting of two lenses, the first lens being nearest to the object and having the radius of curvature of the outer surface between 1.0 and 1.3 times the focal length of the objective, the second lens having its forward surface plano and its rear surface having a curvature of between about 0.4 and 0.5 times the focal length of the objective, said first lens having a value of $N_D$ of 1.720 and the second lens having a value of $N_D$ of 1.5838, said two lenses having Abbe V numbers whose difference is less than 20 with the first lens having the lower Abbe V number, the forward assembly of the rear positive member consisting of a meniscus shaped compound lens whose concave surface faces toward the object and whose total thickness is substantially .262 times the focal length of the objective, the negative lens thereof having a value of $N_D$ of at least 1.700 and an Abbe V value of 30.1, the positive lens thereof having the same $N_D$ value but an Abbe V number of 47.8, said positive lens having its two faces with curvatures of radii between 0.8 and 1.0 times the focal length of the objective, the rear portion of the rear member consisting of two doublets separated by a small air space, the rear surface of the last lens being concave, the curvature of the front surfaces of each of the rear doublets having values so that the centers of curvature are substantially at the position where the object and image are assumed to be in the paraxial region, the radius of curvature of the front surface of the front doublet being substantially less than 4.0 times the focal length of the objective and the radius of curvature of the forward surface of the rear doublet being substantially 1.544 times the focal length of the objective, the thickness of each doublet being the same and being substantially .198 times the focal length of the objective, the forward lens of each doublet having an $N_D$ value of 1.617 and an Abbe V value of 55, the rear lens of each doublet having an $N_D$ value of 1.720 and an Abbe V value of 29.2.

2. The objective according to claim 1 wherein the third lens is the first lens on the objective side of the rear positive member, said third lens having its forward surface concave with a radius of curvature of substantially 2.1771 times the focal length of the objective, the fourth lens having its rear surface convex with a radius of curvature of substantially .8306 times the focal length of the objective, said third and fourth lenses having a total thickness of substantially .262 times the focal length of the objective, said fifth lens being the third lens on the object side of the rear positive member and having a radius of curvature of substantially 1.13 times the focal length at the rear surface thereof, the rear surface of the sixth lens, constituting the rear surface of the second doublet of the rear positive member, being convex and having a radius of curvature of substantially 2.3 times the focal length of the objective, the common surface between the last two lenses making up the last doublet having a radius of curvature of substantially 4.77 times the focal length of the objective and the concave rear surface of the last doublet having a radius of curvature of substantially 3.6 times the focal length of the objective.

3. A photographic objective of the reversed telephoto type conforming substantially to the values given in the following table:

*Example 1 (longer system)*

[EFL=1.000    BFD=1.027    f-3.5.]

| | | | |
|---|---|---|---|
| 1 | R1=+1.2071<br>t1=0.1717<br>R2=−6.2025 | $N_D$=1.720 | V=29.2 |
| | s1=0.0145 | | |
| 2 | R3=Plano<br>t2=0.1048<br>R4=+0.4104 | $N_D$=1.5838 | V=46.0 |
| | s2=0.9371 | | |
| 3 | R5=−2.1771<br>t3=0.0566 | $N_D$=1.700 | V=30.1 |
| 4 | R6=+0.9303<br>t4=0.2053<br>R7=−0.8306 | $N_D$=1.700 | V=47.8 |
| | s3=1.0399 | | |
| 5 | R8=+3.9984<br>t5=0.1234 | $N_D$=1.617 | V=55.0 |
| 6 | R9=−1.1306<br>t6=0.0747<br>R10=−2.2932 | $N_D$=1.720 | V=29.2 |
| | s4=0.0073 | | |
| 7 | R11=+1.5435<br>t7=0.1234 | $N_D$=1.617 | V=55.0 |
| 8 | R12=−4.7700<br>t8=0.0747<br>R13=+3.5972 | $N_D$=1.720 | V=29.2 | wherein the lenses are numbered in numerical order from front to rear, R1 to R13 are the radii of curvature of the successive refracting surfaces of the lenses, t1 to t8 are the axial thicknesses of the lenses, s1 to s4 are the axial spacings between opposed lens surfaces and $N_D$ and V, respectively, are the indices of refraction and the dispersive indices of the several lenses.

4. A photographic objective of the reversed telephoto type conforming substantially to the values given in the following table:

*Example 2 (shorter system)*

[EFL=1.000    BFD=1.027    f-3.5.]

| | | | |
|---|---|---|---|
| 1 | R1=+1.0933<br>t1=0.0809<br>R2=−14.8041 | $N_D$=1.720 | V=29.2 |
| | s1=0.0479 | | |
| 2 | R3=Plano<br>t2=0.0363<br>R4=+0.4269 | $N_D$=1.5838 | V=46.0 |
| | s2=0.8726 | | |
| 3 | R5=−2.1771<br>t3=0.1814 | $N_D$=1.700 | V=30.1 |
| 4 | R6=+1.0733<br>t4=0.0805<br>R7=−0.8306 | $N_D$=1.700 | V=47.8 |
| | s3=1.0399 | | |
| 5 | R8=+3.9984<br>t5=0.1234<br>R9=−1.1306 | $N_D$=1.617 | V=55.0 |
| 6 | t6=0.0747<br>R10=+2.2932 | $N_D$=1.720 | V=29.2 |
| | s4=0.0073 | | |
| 7 | R11=+1.5435<br>t7=0.1234<br>R12=−4.7700 | $N_D$=1.617 | V=55.0 |
| 8 | t8=0.0747<br>R13=+3.5972 | $N_D$=1.720 | V=29.2 | wherein the lenses are numbered in numerical order from front to rear, R1 to R13 are the radii of curvature of the successive refracting surfaces of the lenses, t1 to t8 are the axial thicknesses of the lenses, s1 to s4 are the axial spacings between opposed lens surfaces and $N_D$ and V, respectively, are the indices of refraction and the dispersive indices of the several lenses.

References Cited in the file of this patent

UNITED STATES PATENTS

| | | |
|---|---|---|
| 1,085,868 | Konig | Feb. 3, 1914 |
| 2,548,569 | Tolle | Apr. 10, 1951 |
| 2,600,805 | Reiss | June 17, 1952 |
| 2,629,285 | Baker | Feb. 24, 1953 |
| 2,724,993 | Cook | Nov. 29, 1955 |
| 2,785,603 | Cook | Mar. 9, 1957 |
| 2,803,997 | Hopkins | Aug. 27, 1957 |

UNITED STATES PATENT OFFICE
Certificate of Correction

December 2, 1958

Patent No. 2,862,418　　　　Herman Lowenthal

It is hereby certified that error appears in the printed specification of the above numbered patent requiring correction and that the said Letters Patent should read as corrected below.

Column 6, claim 4, in the table, second column thereof, sixth item, for "$R10 = +2.2932$" read "$R10 = -2.2932$".

Signed and sealed this 17th day of March 1959.

[SEAL]

Attest:
KARL H. AXLINE,
*Attesting Officer.*

ROBERT C. WATSON,
*Commissioner of Patents.*